April 19, 1955 E. G. ELLINGBOE 2,706,439
MECHANICAL HARROW
Filed June 26, 1950 2 Sheets-Sheet 1
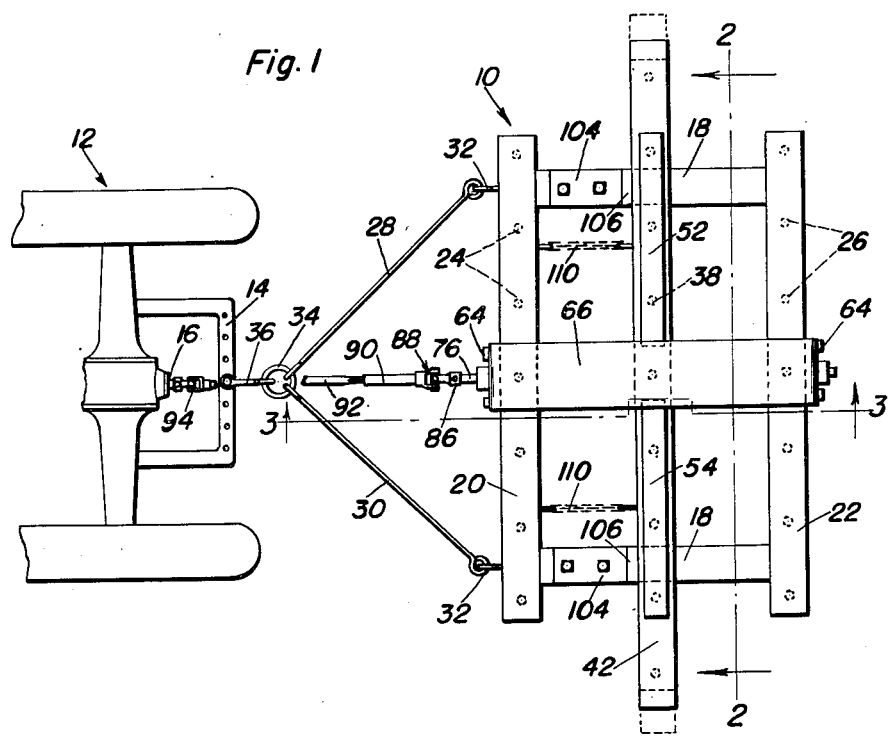
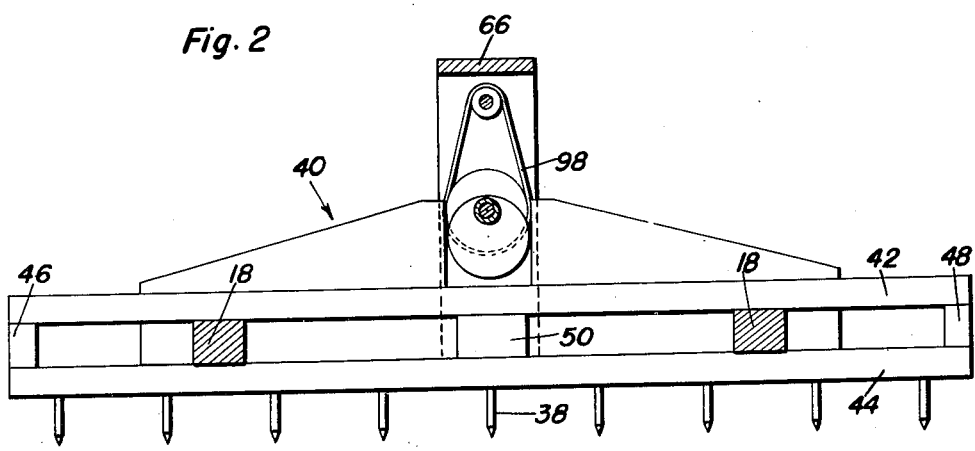
Edmund G. Ellingboe
INVENTOR.
BY *Clarence A. O'Brien*
*and Harvey B. Jacobson*
Attorneys April 19, 1955 E. G. ELLINGBOE 2,706,439
MECHANICAL HARROW Filed June 26, 1950 2 Sheets-Sheet 2

Edmund G. Ellingboe
INVENTOR.

BY
Attorneys

United States Patent Office 2,706,439
Patented Apr. 19, 1955

2,706,439

MECHANICAL HARROW

Edmund G. Ellingboe, Belgrade, Minn.

Application June 26, 1950, Serial No. 170,368

1 Claim. (Cl. 97—44)

This invention comprises novel and useful improvements in a mechanical harrow and more specificially pertains to a harrow which combines with the customary forward movement of the harrow teeth with respect to the soil a further lateral movement of certain of the harrow teeth in the soil for more uniformly and evenly breaking the soil and leaving the same in a more even condition.

The primary object of this invention is to provide a mechanical harrow in which the teeth will have both a longitudinal movement of the same with respect to the soil during passage of the harrow over the soil together with a second and independent lateral movement of certain of the harrow teeth upon the soil.

A further object of the invention is to provide an improved mechanical harrow in conformity with the foregoing objects in which the independent lateral movement of the harrow teeth may be operated and effected in an improved manner from the customary power take-off mechanism with which conventional farm tractors are equipped.

Yet another object of the invention is to provide an improved mechanical harrow which shall have fixed and movable sets of harrow teeth, the movable teeth being mounted upon a carriage supported by and guided for sliding lateral movement with respect to the frame of the harrow together with means for positively reciprocating the carriage of the movable teeth transversely of the harrow frame and in further combination with means permitting limited movement of the carriage of the movable harrow teeth towards and from the fixed teeth, while positively limiting the extremes of this movement.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a top plan view showing a suitable embodiment of mechanical harrow in which the principles of the present invention have been incorporated, the same being shown applied to the rear end of a portion of a farm tractor of conventional design, alternative positions of the movable set of harrow teeth being indicated in dotted lines therein;

Figure 2 is a vertical transverse sectional view taken substantially upon the plane indicated by section line 2—2 of Figure 1 and showing in particular the manner for laterally reciprocating and guiding the carriage of the movable set of harrow teeth during the movement of the same;

Figure 3:
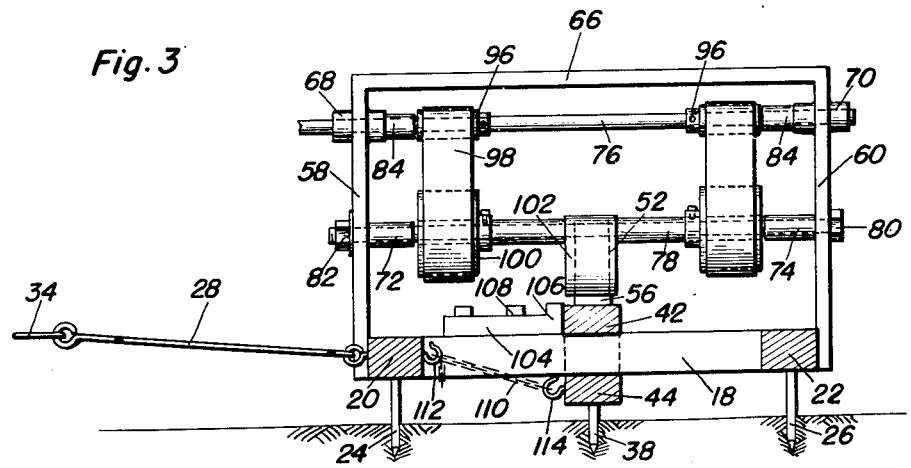
Figure 3 is a vertical longitudinal sectional view taken substantially upon the plane indicated by the section line 3—3 of Figure 1 and showing in particular the manner in which reciprocatory movement is imparted to the carriage containing the movable harrow teeth.

Referring now more specifically to the accompanying drawings, wherein like numerals designate similar parts throughout the various views, the numeral 10 designates generally a supporting frame of a harrow to which the principles of this invention have been applied, this supporting frame being adapted to be connected to the rear portion of a conventional farm tractor indicated generally by the numeral 12, this tractor having the customary drawbar 14 and power take-off shaft 16.

The supporting frame 10 of the harrow comprises a pair of parallel, longitudinally extending support members 18, which are fixedly connected in any desired manner at their front and rear ends to front and rear frame members 20 and 22 respectively, these frame members extending transversely of the harrow and constituting support means for a first and third set of harrow teeth 24 and 26 respectively which depend therefrom.

A pair of connecting links 28 and 30 are provided with eyes at their extremity which are connected respectively to eye bolts 32 secured to the front frame member 20 and to a ring 34 which is detachably secured to any suitable fastener 36 by means of which the harrow may be detachably secured to the drawbar 14 of the tractor.

Figure 4:
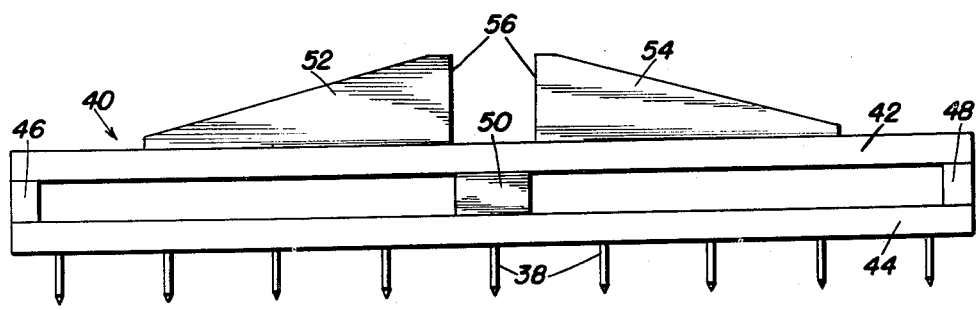
Figure 4 is a front elevational view of the carriage containing the movable harrow teeth.

A set of movable teeth 38 depend from and are fixedly secured to a carriage indicated generally by the numeral 40, see Figure 4, which is supported by the support frame 10 and mounted thereon for lateral or transverse reciprocating movement as set forth hereinafter.

The carriage 40 includes upper and lower members 42 and 44 of any suitable material, these members being secured in fixed relation to each other in a rigid assembly by means of spacer blocks 46, 48 and 50 which are disposed at the ends and intermediate the ends of the upper and lower members. There is thus provided a pair of laterally spaced openings between the upper and lower members which are of sufficient size to guidingly and slidingly receive the above mentioned support members 18 as will be apparent from Figures 2 and 3.

By this means it will be apparent that the carriage is supported upon and is secured to the support members 18 of the harrow frame and as so far described may move both longitudinally and transversely of the support members 18. Fixedly secured to the upper member 42 are a pair of ears 52 and 54 whose adjacent edges are provided with vertically disposed parallel surfaces 56 which thus define a notch therebetween. This notch is adapted to receive an actuator member for imparting transverse reciprocating motion to the carriage as set forth hereinafter.

A support assembly or structure is carried by the supporting frame 10, this assembly including front and rear standards 58 and 60 which extend vertically from the front and rear surfaces at the intermediate portions of the front and rear cross members 20 and 22, being detachably secured thereto as by fastening bolts 64. Secured across the upper ends of the standards 58 and 60 is a longitudinally extending brace member 66 which thus imparts rigidity to the superstructure which, as will be apparent from Figures 1 and 2, is mounted longitudinally and medially above the supporting frame.

The standards 58 and 60 are provided with aligned sets of upper and lower journals 68, 70 and 72, 74 in which are respectively journaled and secured in any desired manner against endwise movement, an upper shaft 76 comprising a drive shaft and a lower shaft 78 constituting an actuator shaft. Conveniently, the lower shaft may have an integral head or enlargement 80 at one end thereof and a screw threaded nut or the like 82 at its other end, the head and nut being disclosed on the outside surfaces of the standards for securing the shaft therein against endwise movement.

The upper or drive shaft 76 may have thrust collars 84 detachably but fixedly secured to the shaft and abutting the adjacent surfaces of the journal bearings 68 and 70 to thus prevent endwise motion of the shaft 76, which extends forwardly from the front standard 58 and is detachably coupled as at 86, see Figure 1, to a universal joint 88 of any desired construction, the same having a forwardly extending tubular shaft 90 which is slidably received but splined or keyed upon a shaft portion 92 which in turn is connected as by universal joint assembly 94 to the above mentioned power take-off shaft 16. It will thus be apparent that rotataion is imparted to the shaft 76 from the power take-off and this despite any change in angularity of or relative change in distance of the shaft 76 from the power take-off shaft.

Figure 5:
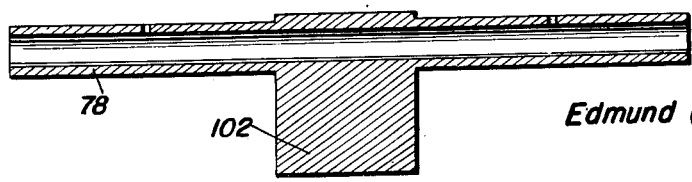
Figure 5 is a vertical sectional view through the actuator shaft of the operating mechanism for imparting reciprocatory movement to the carriage upon which the movable harrow teeth are mounted.

In order to drivingly connect the drive shaft 76 with the actuator shaft 78, the drive shaft has a pair of drive pulleys 96 fixedly secured thereto in any desired manner, and driving belts 98 connect these pulleys with driven pulleys 100 suitably fixedly attached to the shaft 78. Intermediate its ends, the shaft 78, which may conveniently be of a tubular construction as shown in Figure 5, is provided with an integral or a rigidly attached circular, eccentric disk 102 which is rotatably accommodated with the notch between the surfaces 56 on the two ears 52 and 54.

It will now be apparent that when the drive shaft 76 is operated from the power take-off of the tractor, the pulley assembly will cause rotation of the actuator shaft 78 and consequently the eccentric 102 constituting the actuator member will during its rotation cause lateral reciprocation of the carriage 40 and of the second set of harrow teeth carried thereby. Thus, as the harrow moves forward, the longitudinal forward movement of the fixed sets of harrow teeth will be supplemented by the lateral reciprocating movement of the second or intermediate set of teeth which will thus contribute to for effectively breaking the soil and leaving the same in a smooth and even condition after the passage of the harrow.

As so far described, it will be apparent that the carriage and the second set of harrow teeth have a lateral reciprocative movement which is independent of the forward travel of the harrow. Moreover, as so far described it will be seen that the carriage is likewise capable of a longitudinal forward and rearward movement of the same upon its supporting guides, the support members 18, so that the carriage may yield when the same encounters a rock or other obstruction, or when too great a material of soil is engaged by the carriage. However it is desired to limit the extent of this forward and rearward movement of the carriage, and for that purpose stop means are provided.

As shown best in Figures 1 and 3, these stop means include fixed stops in the form of brackets 104 having an abutment portion 106 and removably secured to each of the support members 18 as by fastening bolts 108. These stop members are positioned between the carriage 40 and the forward frame member 20 and the abutment portion 106 thereof thus serves to positively limit the extent of the movement of the carriage towards the front frame member. During its operation therefore, the front surface of the upper member 42 of the carriage will slidingly engage the abutment surfaces of the abutment portions 106.

Rearward movement of the carriage with respect to the front frame member 20 is likewise prevented as by a pair of chains or other flexible members 110, the front end of these chains being secured to hooks 112 fastened to the front frame member 20, and the rear ends of the chains being attached by hooks 114 to the bottom member 44 of the carriage.

It will thus be apparent that the forward and rearward movement of the carriage is kept within positive limits, and the chains 110 may be so adjusted as to permit no rearward movement if desired or permit a limited rearward movement if deemed necessary.

From the foregoing, it is felt that the construction and operation of the device will now be apparent and further explanation is deemed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claim.

Having described the invention, what is claimed as new is:

A mechanical harrow comprising a frame having longitudinal, parallel support members, a first set of harrow teeth fixedly secured to said frame, a carriage having a second set of harrow teeth secured thereto, said carriage being mounted on said support members for transverse sliding movement, means for reciprocating said carriage transversely of said frame, said reciprocating means comprising laterally spaced ears on said carriage defining a notch therebetween, an actuator shaft journaled in said frame, an eccentric disk on said shaft received in said notch and engaging said ears, means for rotating said actuator shaft, said means comprising a drive shaft journaled in said frame parallel to said actuator shaft, means connecting said drive shaft to the power takeoff of a tractor, a driving connection between said drive shaft and said actuator shaft, said driving connection comprising a pair of pulleys mounted on each shaft with the pulleys on one shaft being aligned with the pulleys on the other shaft and a belt entrained around each aligned pair of pulleys.

References Cited in the file of this patent

UNITED STATES PATENTS

| | | |
|---|---|---|
| 124,036 | Cochran | Feb. 27, 1872 |
| 147,874 | Smith | Feb. 24, 1874 |
| 252,806 | Scarr | Jan. 24, 1882 |
| 791,884 | Cyr | June 6, 1905 |
| 1,067,065 | Roddy | July 8, 1913 |
| 1,544,564 | Edwards | July 7, 1925 |
| 2,267,916 | Hershey | Dec. 30, 1941 |
| 2,394,741 | Beard | Feb. 12, 1946 |
| 2,404,651 | Olin | July 23, 1946 |